(12) United States Patent
Weinhold

(10) Patent No.: US 8,603,616 B1
(45) Date of Patent: Dec. 10, 2013

(54) LIGHTWEIGHT TRANSPARENT ARMOR WINDOW

(75) Inventor: Carsten Weinhold, Scranton, PA (US)

(73) Assignee: Schott Corporation, Elmsford, NY (US)

( * ) Notice: Subject to any disclaimer, the term of this patent is extended or adjusted under 35 U.S.C. 154(b) by 1651 days.

(21) Appl. No.: 12/052,021

(22) Filed: Mar. 20, 2008

Related U.S. Application Data

(60) Provisional application No. 60/975,661, filed on Sep. 27, 2007.

(51) Int. Cl.
*B32B 7/02* (2006.01)
*B32B 27/32* (2006.01)
*B32B 9/00* (2006.01)
*B32B 17/06* (2006.01)
*F41H 5/00* (2006.01)
*C03C 1/00* (2006.01)

(52) U.S. Cl.
USPC ........ 428/212; 428/220; 428/412; 428/425.6; 428/428; 428/415; 89/917; 89/903; 89/910

(58) Field of Classification Search
None
See application file for complete search history.

(56) References Cited

U.S. PATENT DOCUMENTS

| | | | |
|---|---|---|---|
| 2,391,353 A | 12/1945 | Sheridan | |
| 3,291,623 A | 12/1966 | Saunders | |
| 3,573,150 A | 3/1971 | Broutman et al. | |
| 3,671,374 A | 6/1972 | Kolarik | |
| 3,725,015 A | 4/1973 | Weaver | |
| 3,730,827 A | 5/1973 | Matchen et al. | |
| 3,749,571 A | 7/1973 | Stibbs et al. | |
| 3,765,300 A | 10/1973 | Taylor et al. | |
| 3,796,564 A | 3/1974 | Taylor et al. | |
| 3,808,012 A | 4/1974 | Bailey et al. | |
| 3,857,744 A | 12/1974 | Moss | |
| 3,947,550 A | 3/1976 | Fitchmun | |
| 4,028,476 A | 6/1977 | Kleinschmidt et al. | |
| 4,154,787 A | 5/1979 | Brown | |
| 4,209,474 A | 6/1980 | Prochazka | |
| 4,473,653 A | 9/1984 | Rudoi | |
| 4,494,342 A | 1/1985 | Decker | |
| 4,633,756 A | 1/1987 | Rudoi | |
| 4,704,943 A | 11/1987 | McDougal | |
| 4,737,327 A | 4/1988 | Hatta et al. | |
| 4,869,175 A | 9/1989 | McDougal | |
| 4,911,061 A | 3/1990 | Pivitt et al. | |
| 4,953,442 A | 9/1990 | Bartuski | |

(Continued)

FOREIGN PATENT DOCUMENTS

| | | |
|---|---|---|
| EP | 322007 | 6/1989 |
| EP | 470621 | 2/1992 |

(Continued)

OTHER PUBLICATIONS

Amptiac Newsletter Fall 2000 vol. 4, No. 3 pp. 1-24.

(Continued)

*Primary Examiner* — David Sample
*Assistant Examiner* — Nicole T Gugliotta
(74) *Attorney, Agent, or Firm* — Ohlandt, Greeley, Ruggiero & Perle, LLP

(57) ABSTRACT

The invention relates to a lightweight transparent armor laminate comprising layers of borosilicate glass, layers of transparent glass-ceramics and a polymer spall layer of polycarbonate and/or polymethyl methacrylate. The layers are bound by polyurethane and/or polyvinylbutyral interlayer films.

25 Claims, 11 Drawing Sheets

(56) References Cited

U.S. PATENT DOCUMENTS

| | | | |
|---|---|---|---|
| 5,060,553 A * | 10/1991 | Jones | 89/36.02 |
| 5,502,011 A | 3/1996 | Yamamoto et al. | |
| H1567 H | 8/1996 | Parsons et al. | |
| 5,567,529 A | 10/1996 | Smith | |
| 5,640,666 A | 6/1997 | Jayashankar et al. | |
| 5,783,297 A | 7/1998 | Wise et al. | |
| 5,952,253 A | 9/1999 | Dejneka et al. | |
| 6,197,429 B1 | 3/2001 | Lapp et al. | |
| 6,334,382 B2 | 1/2002 | Gourio | |
| 6,408,733 B1 | 6/2002 | Perciballi | |
| 6,699,412 B2 | 3/2004 | Gadkaree et al. | |
| 6,708,595 B1 | 3/2004 | Chaussade et al. | |
| 6,756,121 B2 | 6/2004 | Forsythe et al. | |
| 6,805,034 B1 | 10/2004 | McCormick et al. | |
| 6,862,970 B2 | 3/2005 | Aghajanian et al. | |
| 6,895,851 B1 | 5/2005 | Adams et al. | |
| 6,995,103 B2 | 2/2006 | Aghajanian | |
| 7,104,177 B1 | 9/2006 | Aghajanian et al. | |
| 7,147,544 B2 | 12/2006 | Rosenflanz | |
| 7,157,149 B2 | 1/2007 | Belykh et al. | |
| 7,197,972 B2 | 4/2007 | Aghajanian et al. | |
| 7,332,221 B2 | 2/2008 | Aghajanian et al. | |
| 7,335,331 B1 | 2/2008 | Husnay et al. | |
| 2002/0183187 A1 | 12/2002 | Siebers et al. | |
| 2003/0035917 A1 | 2/2003 | Hyman | |
| 2003/0092558 A1 | 5/2003 | Aghajanian | |
| 2003/0110931 A1 | 6/2003 | Aghajanian et al. | |
| 2004/0020354 A1 | 2/2004 | Ravid et al. | |
| 2004/0065868 A1 | 4/2004 | Aghajanian et al. | |
| 2004/0157720 A1 | 8/2004 | Sakamoto et al. | |
| 2005/0119104 A1 | 6/2005 | Alexander et al. | |
| 2005/0135724 A1 | 6/2005 | Helvajian et al. | |
| 2007/0060465 A1 | 3/2007 | Varshneya et al. | |
| 2007/0068375 A1 | 3/2007 | Jones et al. | |
| 2008/0032104 A1 * | 2/2008 | Mannheim Astete et al. | 428/215 |
| 2008/0092729 A1 | 4/2008 | Cook | |
| 2008/0264244 A1 | 10/2008 | Ravid et al. | |
| 2008/0280034 A1 | 11/2008 | Mathis et al. | |
| 2009/0217813 A1 | 9/2009 | Carberry et al. | |
| 2010/0154622 A1 * | 6/2010 | Zachau et al. | 89/36.02 |
| 2010/0242715 A1 | 9/2010 | Raichel et al. | |

FOREIGN PATENT DOCUMENTS

| | | |
|---|---|---|
| GB | 2146315 | 4/1985 |
| GB | 2284655 | 6/1995 |
| JP | 02129071 | 5/1990 |
| JP | 10279376 | 10/1998 |
| WO | WO 03022767 | 3/2003 |
| WO | 2006135832 | 12/2006 |
| WO | WO 2008/130457 A1 * | 10/2008 ... F41H 5/04 |
| WO | 2009008914 | 1/2009 |

OTHER PUBLICATIONS

Field J. E. -Invest'Gation of the Impact Performance of Various Glass and Ceramic Systems; Aug. 1988, pp. 1-89 United States Army Eurppean Research Office, London England.
Parimal J. Patel, Improved Low-Cost Multi-Hit Transparent Armor, pp. 1-22 U.S. Army Research Laboratory Aberdeen Proving Ground, MD.
Peter Dehmer, High Performance Visors, ARL-RP-45, Aug. 2002 Army Research Laboratory.
I. Horsfall, Glass Ceramic Armour Systems for Light Armour Applications, pp. 1345-1351, *19th International Symposium of Ballistics*, May 7-11, 2001, Interlaken, Switzerland.
D.J. Obrien, Optically Transparent Nanoporous Glasspolymer Composites, pp. 1-6, U.S. Army Research Laboratory, Weapons and Materials Research Directorate Aberdeen Proving Ground, MD.
U.S. Appl. No. 11/689,299, filed Jan. 7, 2009, Carberry et al.
Burge et al.; "Thermal Expansion of Borosilicate Glass, Zerodur, Zerodur M, and Unceramized Zerodur at Low Temperatures"; Applied Optics, vol. 38, Issue 34; pp. 7161-7162 (1999).
Chinese Office Action (with English translation) dated Dec. 7, 2011 for Chinese application No. 200880109500.1.
International Search Report dated Apr. 19, 2009 for PCT application No. PCT/US2008/077873.
Written Opinion dated Apr. 19, 2009 for PCT application No. PCT/US2008/077873.
International Search Report dated Sep. 16, 2008 for PCT application No. PCT/US2007/025888.
Written Opinion dated Sep. 16, 2008 for PCT application No. PCT/US2007/025888.
International Search Report dated Apr. 20, 2012 for PCT application No. PCT/US2010/000033.
Written Opinion dated Apr. 20, 2012 for PCT application No. PCT/US2010/000033.
International Search Report dated Dec. 12, 2008 for PCT application No. PCT/US2008/003662.
Written Opinion dated Dec. 12, 2008 for PCT application No. PCT/US2008/003662.

* cited by examiner

Figure 6

Top View (Cut through Center)

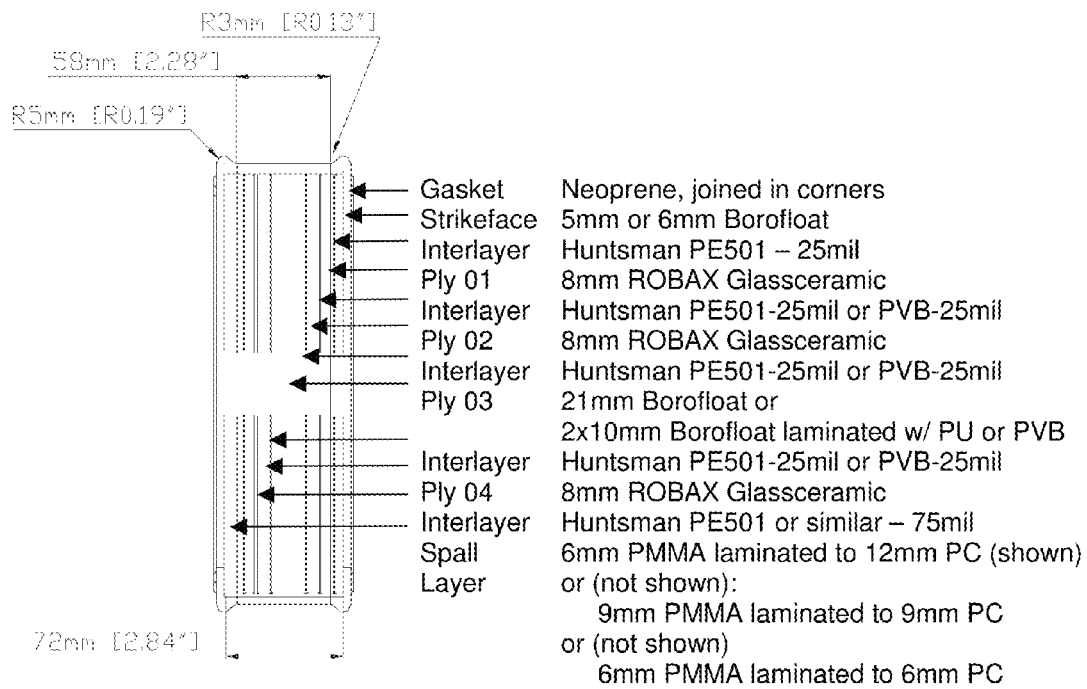

| Layer | Material |
|---|---|
| Gasket | Neoprene, joined in corners |
| Strikeface | 5mm or 6mm Borofloat |
| Interlayer | Huntsman PE501 – 25mil |
| Ply 01 | 8mm ROBAX Glassceramic |
| Interlayer | Huntsman PE501-25mil or PVB-25mil |
| Ply 02 | 8mm ROBAX Glassceramic |
| Interlayer | Huntsman PE501-25mil or PVB-25mil |
| Ply 03 | 21mm Borofloat or 2x10mm Borofloat laminated w/ PU or PVB |
| Interlayer | Huntsman PE501-25mil or PVB-25mil |
| Ply 04 | 8mm ROBAX Glassceramic |
| Interlayer | Huntsman PE501 or similar – 75mil |
| Spall Layer | 6mm PMMA laminated to 12mm PC (shown) or (not shown): 9mm PMMA laminated to 9mm PC or (not shown) 6mm PMMA laminated to 6mm PC |

Side View (Cut through Center)

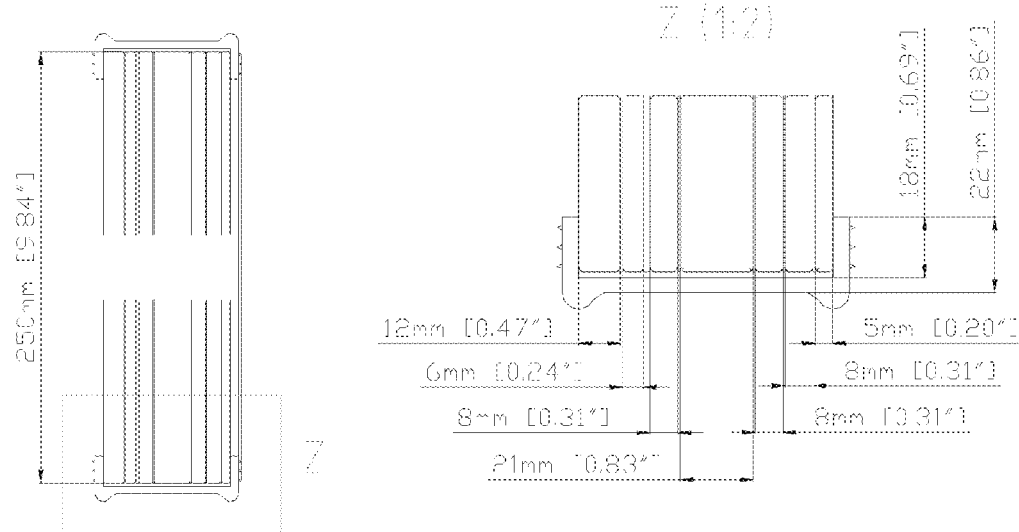

Projectiles, obliquities and velocities for ballistic acceptance tests according to MIL-G-5485D [22-Feb-1993]

Figure 8 : Common failure and defeat mechanisms
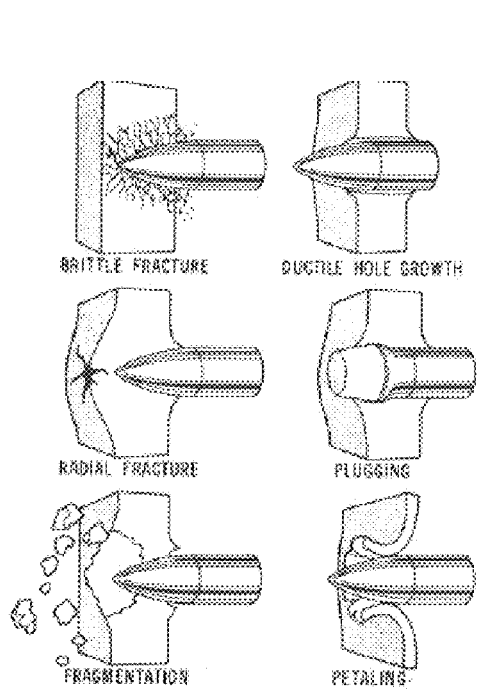
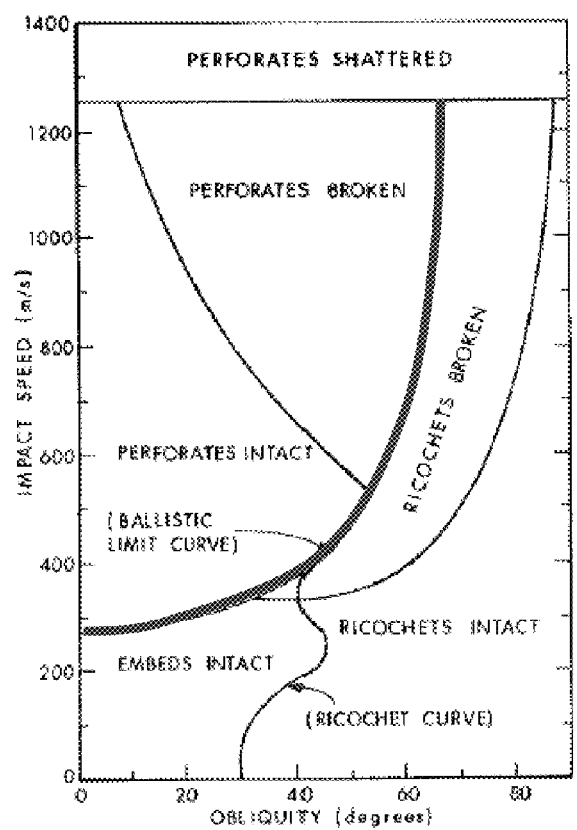
*Backman [1976]*
*Backman and Goldsmith [1978]*

Figure 9: Typical appearance of sample before and after ballistic impact test
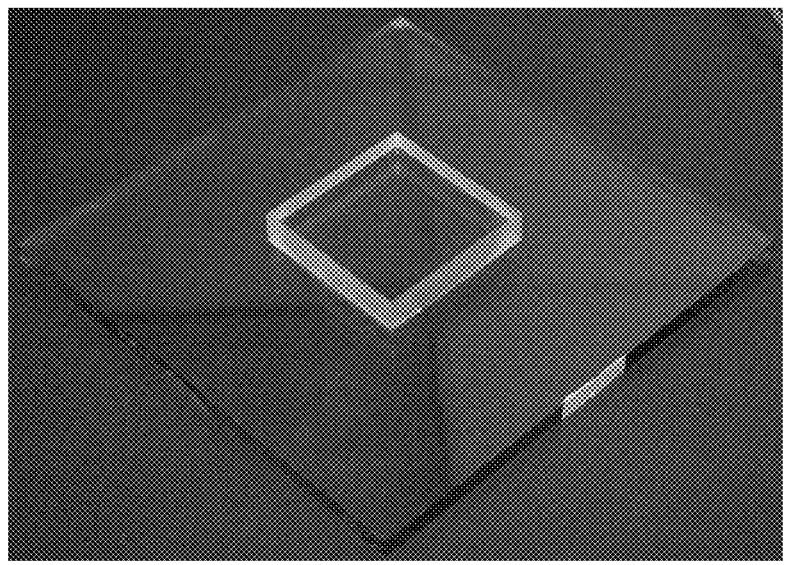
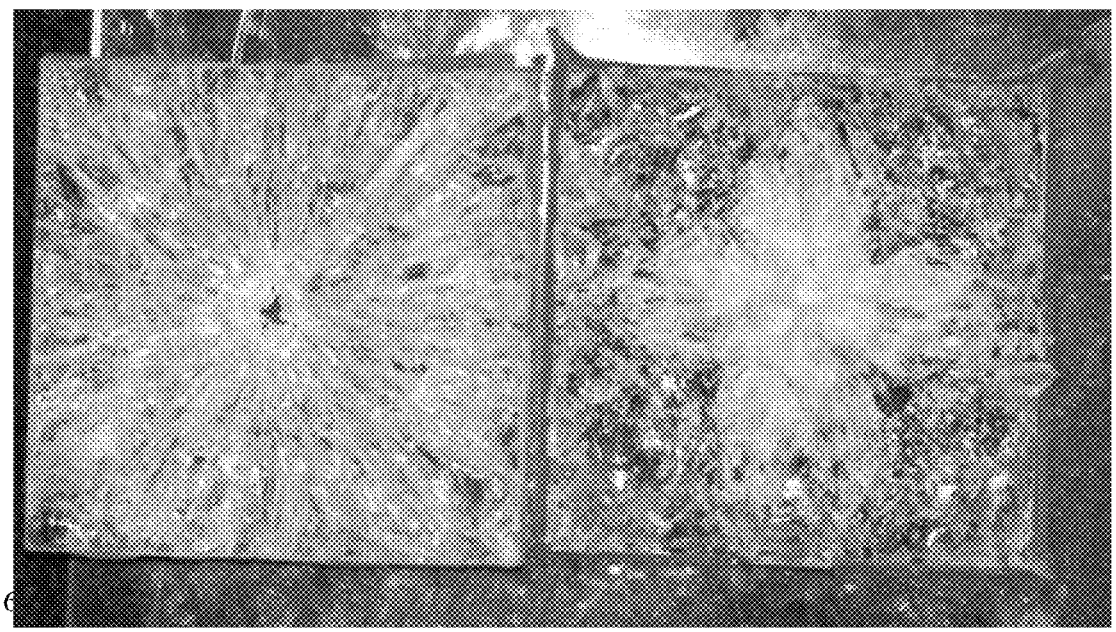

Figure 10: Typical appearance of retrieved AP-M2 cores
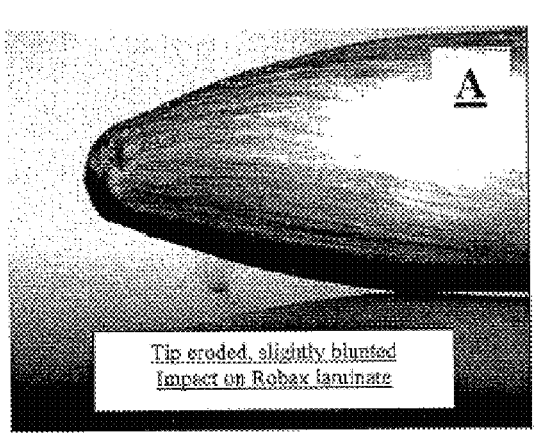
Tip eroded, slightly blunted
Impact on Robax laminate
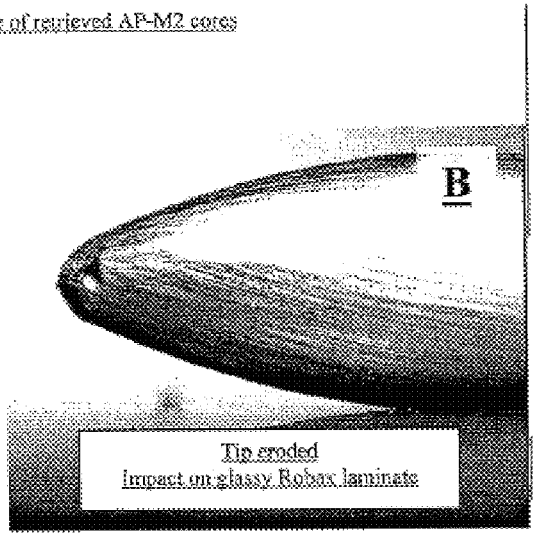
Tip eroded
Impact on glassy Robax laminate
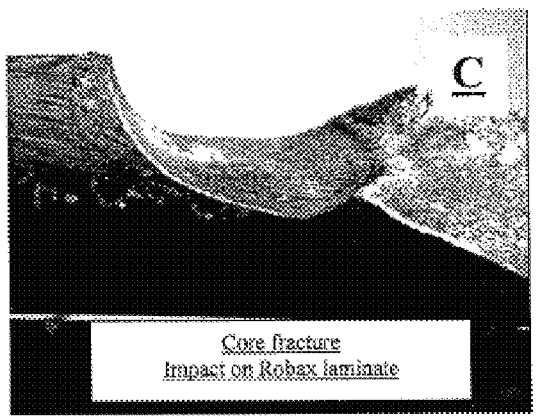
Core fracture
Impact on Robax laminate
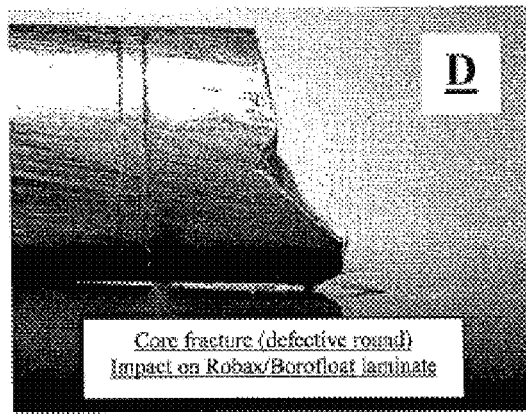
Core fracture (defective round)
Impact on Robax/Borofloat laminate

# LIGHTWEIGHT TRANSPARENT ARMOR WINDOW This application claims the benefit of the filing date of U.S. Provisional Application Ser. No. 60/975,661 filed Sep. 27, 2007.

Commercially available, glass-based transparent armor typically consists of multiple glass and polymer layers, which are laminated together to form a relatively thick composite. The resulting composite must be transparent and essentially free of optical distortion while providing maximum protection against ballistic impact of projectiles and fragments at minimum weight and minimum cost. Of particular interest are transparent laminates, which restrict the destruction caused by the projectile locally to ensure maximum residual vision and provide protection against multiple hits.

To successfully stop a projectile, impact resistant transparent laminates typically engage various defeat mechanisms, including projectile fragmentation and mass removal by projectile erosion. Systems employing transparent ceramic materials such as, for example, transparent spinel, sapphire, or AlON, show superior ballistic performance over traditional glass-based systems, but are often not available in larger sizes and volumes. Currently, the cost per square inch for these systems is typically more than 5 times higher than for glass-based systems offering comparable protection.

SUMMARY OF THE INVENTION

According to one aspect of the invention there is provided a multi-layer transparent laminate having a plurality of layers bound together by polymer interlayers. The multi-layer laminate has an outer soda-lime or borosilicate glass strike face layer, a plurality of glass-ceramic layers, at least one internal soda-lime or borosilicate glass layer, and a polymer spall layer. The glass-ceramic and internal soda-lime or borosilicate glass layers are disposed between the strike face layer and the spall layer. Overall the thickness of the composite is preferably less than 80 mm, whereas the overall areal density is preferably less than 30 psf.

According to another aspect of the invention there is provided a multi-layer transparent laminate having a plurality of layers bound together by polymer interlayers. The multi-layer laminate has an outer glass-ceramic strike face layer, at least one additional glass-ceramic layer, at least one internal soda-lime or borosilicate glass layer, and a polymer spall layer. The glass-ceramic and internal soda-lime or borosilicate glass layers are disposed between the strike face layer and the spall layer. Overall the thickness of the composite is preferably less than 80 mm, whereas the overall areal density is preferably less than 30 psf.

According to another aspect of the invention there is provided a multi-layer transparent laminate having a plurality of layers bound together by polymer interlayers. The multi-layer laminate has a soda-lime or borosilicate glass layer disposed between two glass-ceramic layers and a polymer spall layer. Overall the thickness of the composite is preferably less than 80 mm Thus, the present invention relates to a multi-layer transparent laminate having a plurality of layers joined together by polymer interlayers. All layers are commercially available. The multi-layer laminate may comprise an outer soda-lime or borosilicate glass strike face layer, a plurality of glass-ceramic layers, at least one internal soda-lime or borosilicate glass layer, and a polymer spall layer. The glass-ceramic and glass layers are disposed between the strike face and the spall layer. The overall thickness of the composite is preferably less than 80 mm.

Present State-of-the-Art glass-based systems provide single-hit protection against armor piercing projectiles (STANAG Level 3 or similar) at oblique impact at areal densities of about 30 psf. In comparison to other glass-based impact-resistant laminates, the designs disclosed provide multi-hit protection against 0.30 cal. AP-M2 or similar projectiles at impact speeds of up to 2750 fps at a thickness of less than 80 mm and an areal density of less than 30 psf. Single-hit protection against the same threat is achievable at an areal density of less than 25 psf by removing one of the glass ceramic layers. The composites are useful, for example, as transparent armor structures in military and security vehicles as well as for windows in secured buildings applications.

Preferably the strike face is a 3-6 mm thick layer of BOROFLOAT® glass. Preferably, at least three glass-ceramic layers are disposed between the strike face and the spall layer. Each glass-ceramic layer is from about 6-14 mm thick. Preferred glass ceramics are lithium-alumo-silicate glass ceramics such as SCHOTT's ROBAX® or ZERODUR®, or a lithium-disilicate glass ceramic such as ALSTOM's TRANSARM®. Alternatively, the outer strike face layer may be a glass-ceramic layer.

The internal soda-lime or borosilicate glass layer is from about 14-25 mm thick and is disposed between two of the glass-ceramic layers. The internal soda-lime or borosilicate glass layer can be monolithic, or a multi-layer laminate consisting of individual layers with thicknesses between about 6-19 mm, most preferably between about 7-14 mm and bound together by a polymer interlayer. Preferred glasses are borosilicates such as PYREX® or BOROFLOAT®.

The spall layer is preferably made out of polycarbonate, polymethyl-methacrylate, or a combination thereof. Preferably, the spall layer has a thickness in the range of about 10-20 mm, and consists of a single layer of polymethyl-methacrylate laminated to a single layer of polycarbonate, e.g., by a polymer interlayer.

All laminate layers are joined together with polymer interlayers. Each interlayer may range from about 10 to 80 mil thick in the finished laminate. Most preferably the polymer interlayer is polyurethane or polyvinylbutyral. Select interlayers may be reinforced, for example by incorporating a tear-resistant PET film. Optionally, a thin glass layer may be laminated to the backside of the spall layer to protect the polymer surface against degradation including scratches and chemical attack by window cleaning agents.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 6 shows various views of a small-size (250 mm×250 mm) window with gasket;

FIG. 8 shows common failure modes and defeat mechanisms in ballistic impact situations;

FIG. 9 shows the typical appearance of a ballistic test coupon mounted on an oversized polycarbonate backing before and after the ballistic impact test; and FIG. 10 shows the appearance of 0.30 cal. AP-M2 cores after impact with various laminates according to the invention.

DETAILED DESCRIPTION OF THE INVENTION

Figure 1:
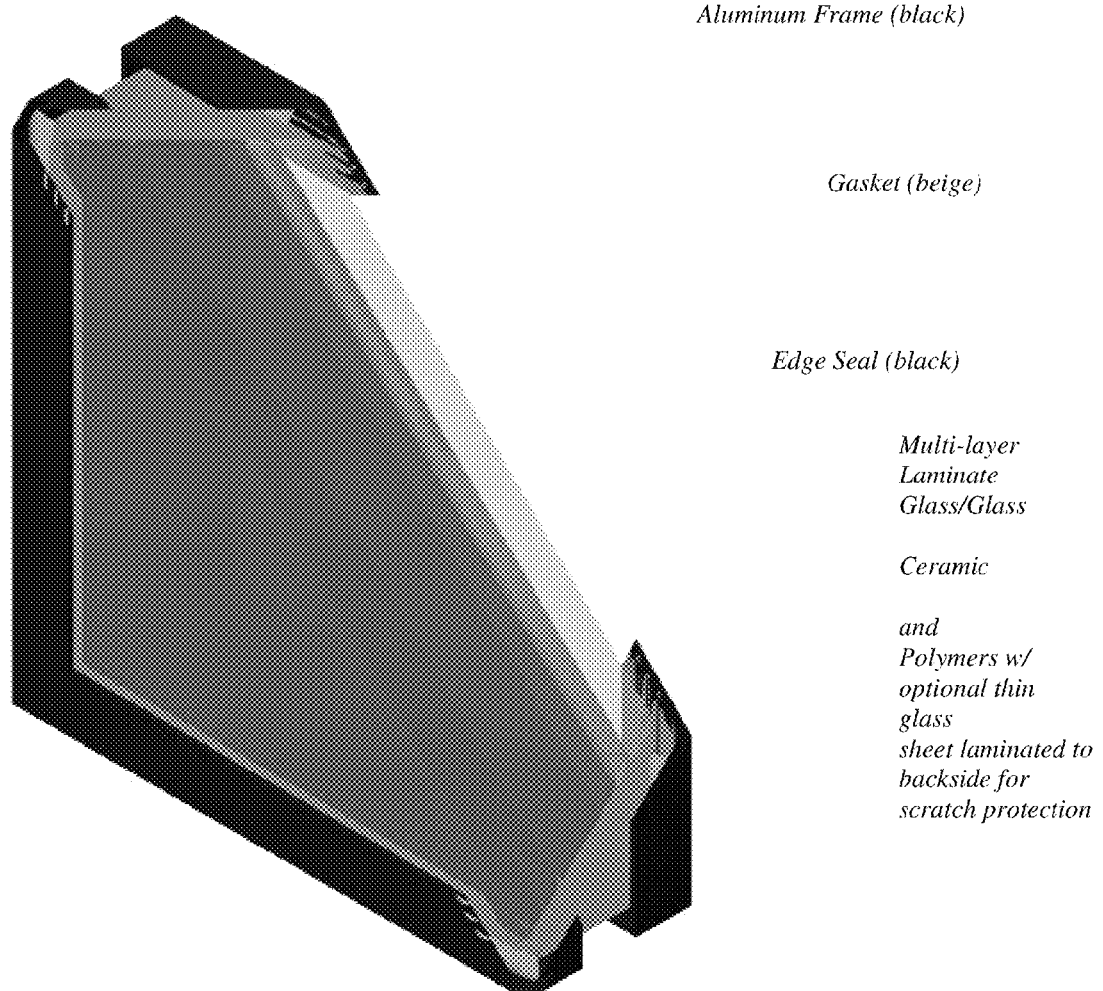
FIG. 1 shows an isometric view of a multi-layer laminate of Glass/Glass Ceramic and Polymers with an optional thin glass sheet laminated to backside of the spall layer.
Figure 2:
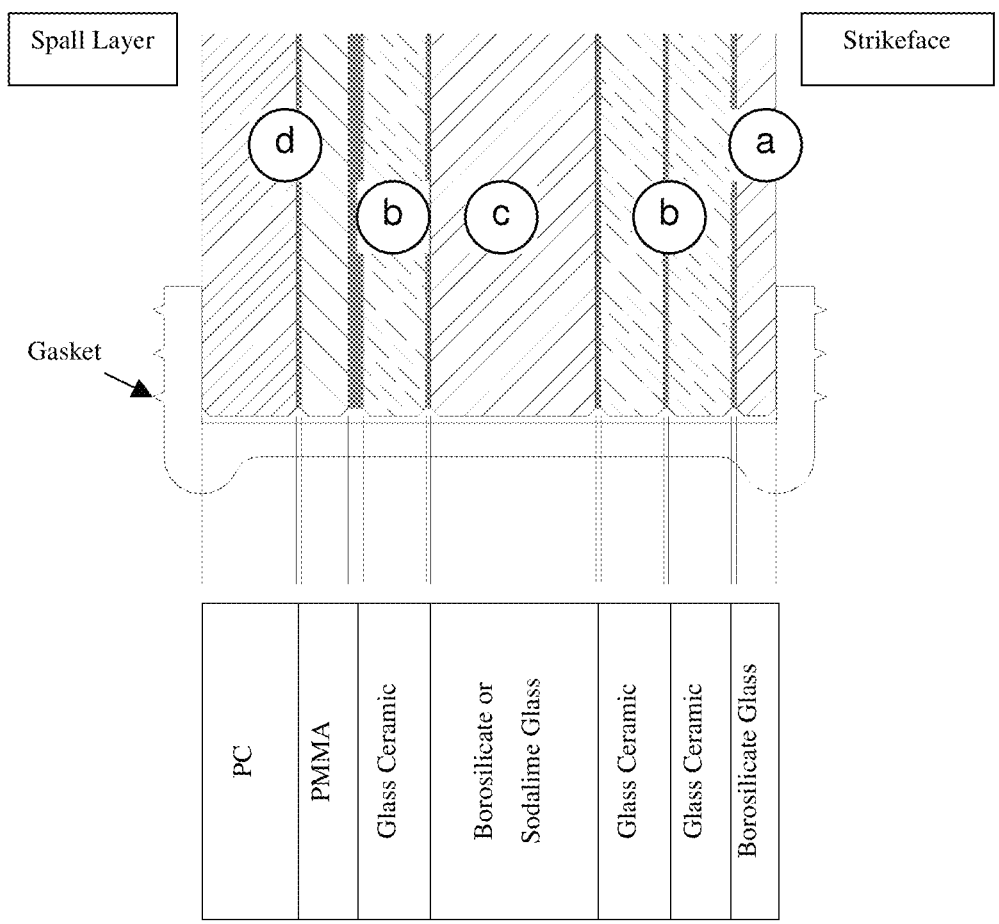
FIG. 2 shows a cross-section through one edge of the multi-layer laminate according to the invention; the multi-layer laminate is surrounded by a gasket, which is surrounded by a frame (not depicted) made out of a high-strength aluminum alloy.
Figure 3:
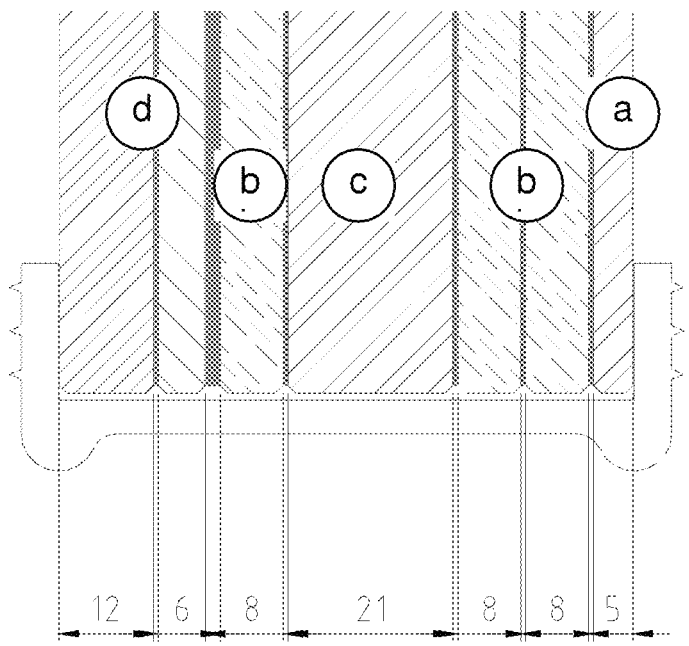
FIG. 3 shows a cross-section through a preferred embodiment of the multi-layer laminate according to the invention. A preferred thickness designation (mm) for each layer is indicated.
Figure 4:
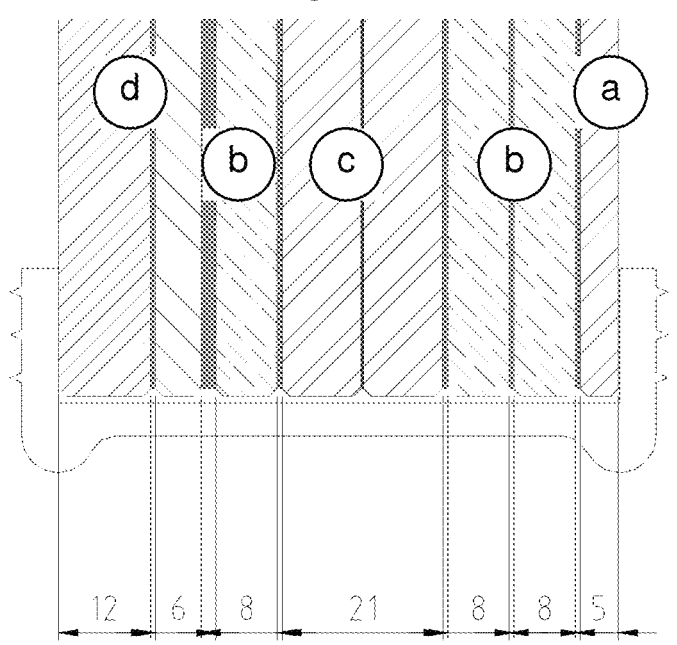
FIG. 4 shows another preferred embodiment, where the monolithic internal glass layer is replaced by a double-layer glass laminate. A preferred thickness designation (mm) for each layer is indicated.
Figure 5:
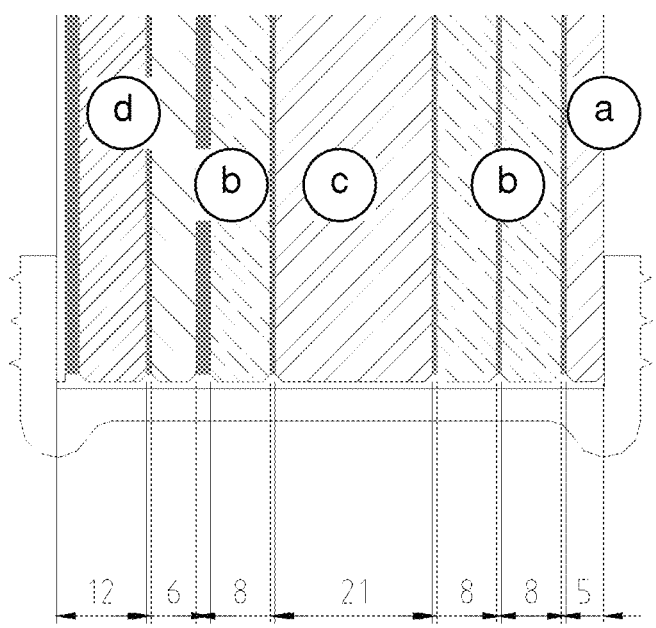
FIG. 5 shows another preferred embodiment, where the polycarbonate layer is replaced by a thin-glass/polycarbonate laminate. A preferred thickness designation (mm) for each layer is indicated.
Figure 7:
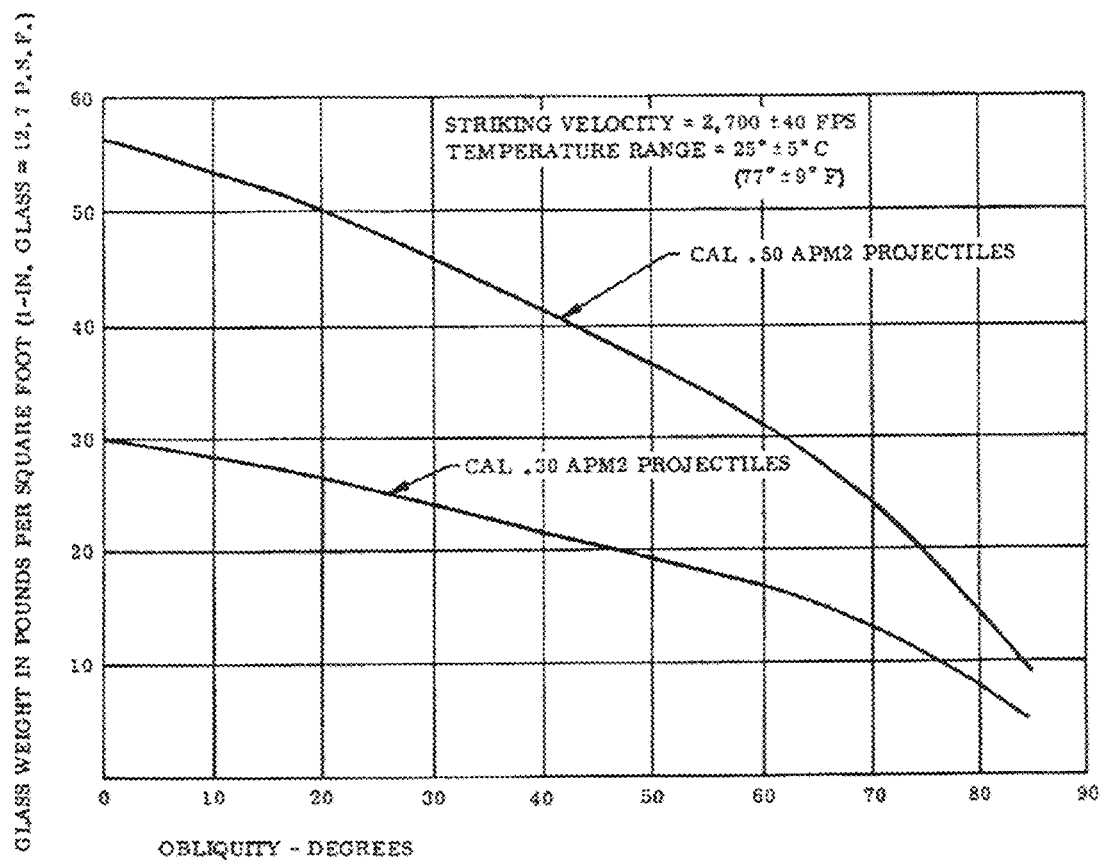
FIG. 7 shows critical areal densities for traditional glass-based systems depending on impact obliquity as disclosed in the US Military Specification MIL-G-5485D (22 Feb. 1993)

The abbreviations used herein shall mean the following unless otherwise specified.

0.30 cal. AP-M2 Projectile type/designation; Armor Piercing M2
ALSTOM Company name
CTE coefficient of thermal expansion
DOP Depth-of-Penetration (ballistic test)
fps Feet per second
mil one thousands of an inch (1 mil=25.4 microns)
mm millimeter
PC Polycarbonate
PMMA Polymethyl methacrylate
PU Polyurethane
PVB Poly-Vinylbutyral
psf pounds per square foot
SCHOTT Company name
TPU thermoplastic Polyurethane
Vs Striking velocity
Vr Residual velocity
Vs/Vr Striking versus residual velocity (ballistic test)

The strike face is the side of the laminate that is most likely to encounter the initial impact of a projectile. The preferred material for the strike face is a borosilicate glass, most preferably BOROFLOAT® from SCHOTT Germany. Preferred is a glass layer having a thickness of more than about 3 mm but less than about 6 mm, which is able to withstand the impact of debris in every-day use (e.g., rock strikes, etc.). Alternatively, soda-lime glass or a polymer sheet or multiple tear-resistant films with scratch-resistant coating can also be used for the strike face material. Alternatively, a glass-ceramic can also be used for the strike face material. In the disclosed design, the strike face layer has multiple functions. First and foremost, it was found that the use of a high-surface quality material in combination with standard polymer interlayers enable the use of glass-ceramic material as-rolled, i.e without grinding and polishing, to achieve an essentially distortion-free, transparent view. Mechanically, the strike face protects the surface of layer 1 against scratches, and acts in combination with layer 1 and layer 2 to slow-down and destabilize (i.e. tip or turn) the projectile in order to induce fragmentation by side-impact.

The adhesive interlayers are preferably made from a material such as polyvinyl butyral (PVB) or polyurethane (PU). The interlayers are optically transparent, provide strength and add only a minimal thickness and weight to the overall laminate.

Polyurethane resins provide not only good bonding to glass but also provide excellent internal strength. Polyurethane resins are much lighter than glass and have been found to expand and contract at rates close to that of standard glass, thus leading to minimal cracking or delamination during thermal expansion and contraction of the laminate. Trade names for suitable polyurethane films include: Huntsman Krystal-Flex®, and Deerfield DureFlex®.

Polyvinyl butyral (or PVB) is also an excellent choice for interlayer. It provides bonding between the laminate layers. Polyvinyl butyral is a resin usually used for applications that require strong binding, optical clarity, and adhesion to many surfaces, toughness and flexibility. It is prepared from polyvinyl alcohol by reaction with butyraldehyde. The major application is laminated safety glass for automobile windshields. Trade names for PVB-films include: BUTACITE®, SAFLEX®, S-Lec® and TROSIFOL®.

In a preferred embodiment, preferably each interlayer film thickness is around 25 mil to accommodate thermal expansion mismatches between the layers and to accommodate uneven gaps caused by thickness variations and/or surface figure deviations of the individual layers. In certain layers, 50 mil or 75 mil thick interlayer films may replace the 25 mil interlayer films. Alternatively, to increase multi-hit performance, one or more of the interlayer films may be an optical TPU laminates incorporating a PET film, such as, for example STEVENS SECURSHEILD®. In general each polymer interlayer performs a specific function. Interlayer 1 acts to bond the strike face to a first layer (e.g., ROBAX). Preferably, the interlayer is a soft material having good adhesion to BOROFLOAT® (preferred strike face) and ROBAX® (preferred first layer). Interlayer 1 accounts for the slight difference in thermal expansion between the layers and enables flexing of the strike face upon impact to destabilize the projectile. Interlayer 1 can be reinforced with a tear-resistant film to keep comminuted material in the laminate. Interlayer 2 acts to bond a first layer to a second layer. If, for example, both layers are ROBAX® and have the same thermal expansion, then preferably the chosen interlayer is hard with good adhesion to ROBAX®, such that both layers behave together like a monolithic piece upon impact. The ballistic function of interlayer 2 is to arrest cracks and to hold comminuted material in place thus slowing and/or deflecting the projectile. Interlayer 3 acts to bond a second layer to a third layer. If both layers have a slightly different thermal expansion, then preferably the interlayer is soft and has good adhesion to both materials. The ballistic function of interlayer 3 is to arrest cracks, hold comminuted material in place, and promote slowing and/or deflection of the projectile. Interlayer 4 acts to bond a third layer to a fourth layer. If both layers have a slightly different thermal expansion then preferably the interlayer is soft and has good adhesion to both materials. The ballistic function of interlayer 4 is to arrest cracks, hold the comminuted material in place and to promote slowing and/or deflection of the projectile. Interlayer 5 bonds the back of a fourth layer to the Spall-Layer. To account for the difference in thermal expansion (about one order of magnitude), a thicker, preferably soft interlayer is preferably used.

Additional suitable materials for the interlayer include transparent thermoplastics or thermosets such as acrylonitrile-butadien-styrene (BS), acetyl resins, cellulose acetate, cellulose acetate butyrate, cellulose acetate propionate, cellulose tri-acetate, acrylics and modified acrylics, allyl resins, chlorinated polyethers, ethyl cellulose, epoxy, fluoroplastics, ionomers (e.g., Dupont Surlyn A®), melamines, nylons, parylene polymers, transparent phenolics, phenoxy resins, polybutylene, polycarbonates, polyesters, polyethylenes, polyphenylenes, polypropylenes, polystyrenes, polyurethanes, polysolphones, polyvinyl-acetate, polyvinyl butyral, silicones, as well as styrene-acrylonitride and styrene-butadiene copolymers.

If the spall layer is a combination of PMMA on PC then an interlayer 6 is used to bond the two spall layers together. This interlayer has to be stiff and provide good adhesion. The combination of PMMA on PC is known to improve the ballistic performance of systems due to the stiffening of PMMA under high strain rates with PC providing a more stretchable support. Further, the gradual change in acoustic impedance provides a better impedance-match to the last layer.

If the spall layer is protected by a thin glass layer against abrasion or chemical attack, then an interlayer 7 with a thickness of 50 mil or 75 mil is used to bond the thin glass sheet to the back of the polycarbonate. To improve mechanical performance, the thin glass sheet might be chemically strengthened.

Additional suitable materials for the spall layer include transparent thermoplasts or thermosets such as acrylonitrile-butadien-styrene (BS), acetyl resins, cellulose acetate, cellulose acetate butyrate, cellulose acetate propionate, cellulose tri-acetate, acrylics and modified acrylics, allyl resins, chlorinated polyethers, ethyl cellulose, epoxy, fluoroplastics, ionomers (e.g., Dupont Surlyn A®), melamines, nylons, parylene polymers, transparent phenolics, phenoxy resins, polybutylene, polycarbonates, polyesters, polyethylenes, polyphenylenes, polypropylenes, polystyrenes, polyurethanes, polysolphones, polyvinyl-acetate, polyvinyl butyral, silicones, as well as styrene-acrylonitride and styrene-butadiene copolymers.

In general, ballistic performance of a system is improved if the interlayer is strong enough to hold comminuted material in place and prevent ejection; in that case, the tightly packed, broken material is typically able to provide about 70% of the penetration resistance of intact material.

The multi-layer laminate of the present invention preferably contains at least three glass-ceramic layers each of which is preferably from about 6-14 mm thick. Glass-ceramic materials exhibit a unique microstructure, and share many properties with both glass and more traditional crystalline ceramics. They are formed as a glass, and then made to crystallize partly by heat treatment. Unlike sintered ceramics, glass-ceramics have no pores between crystals. Some well-known brands of glass-ceramics are PYROCERAM®, CERAN®, NEOCERAM®, EUROKERA®, or MACOR®. The preferred glass-ceramic of the present invention is ROBAX® glass ceramic from SCHOTT, which can be in the glassy or the ceramized state. Alternatively, it can be replaced by other glass ceramic materials such as ZERODUR® from SCHOTT, TRANSARM® from ALSTOM, CLEARCERAM® from OHARA, KERALITE®, PYROCERAM®, PYROCERAM III® AND VISION® from CORNING, NEOCERAM® from NEG, and CDM glass Ceramic. Mechanically, the glass-ceramic layers act to slow-down and/or catch projectile fragments as well as provide support to the neighboring layers.

TABLE 1

Typical Properties of Select Glasses and Glass-Ceramics

| Glass Type | Density [g/ccm] | Sound Velocities | | Young's Modulus [G Pa] | Poisson's Ratio | CTE [$10^{-6}$/K] | Knoop Hardness |
| --- | --- | --- | --- | --- | --- | --- | --- |
| | | VLong [m/s] | V shear [m/s] | | | | |
| Sodalime Glass | 2.5 | 5850 | 3450 | 73 | 0.23 | 8.9 | 480 |
| PPG Starphire | 2.5 | 5550 | 3400 | 72 | 0.22 | 9.03 | |
| SCHOTT BOROFLOAT | 2.23 | 5550 | 3400 | 62 | 0.2 | 3.25 | 480 |
| SCHOTT Robax | 2.53 | 6650 | 3850 | 94 | 0.25 | 0+/−0.5 | 540 |
| SCHOTT Robax glassy | 2.43 | 6200 | 3750 | 83 | 0.2 | | 520 |
| SCHOTT Zerodur | 2.53 | 6220 | 3700 | 82 | 0.22 | | 560 |
| ALSTOM Transarm | 2.45 | 7000 | 4250 | 105 | 0.2 | | |

The internal soda-lime or borosilicate-glass layer is positioned within the laminate between two glass-ceramic layers, and may comprise one or more individual layers. Borosilicate glass is less dense than ordinary glass and has a very low thermal expansion coefficient, about one-third that of ordinary glass. This reduces material stresses caused by temperature gradients, thus making it more resistant to breaking. Due to the smaller CTE mismatch to the neighboring glass-ceramic layers, their lower density and their ballistic properties, borosilicate glasses are preferred. Due to its optical quality and transparency, BOROFLOAT® is the preferred borosilicate glass, however other borosilicate glasses such as ENDURAL® or BOMEX® are also contemplated. In certain applications soda-lime glass may be used. Mechanically, the internal soda-lime or borosilicate layer provides support to the preceding layers, and acts to slow-down and/or catch projectile fragments. Preferably, the internal soda-lime or borosilicate glass layer comprises two individual sub-layers laminated together and is from is 14 to 25 mm thick. Each individual sub-layer of may be from 6-19 mm thick, most preferably between about 7-14 mm. The sub-layers are bound together by a polymer interlayer.

The spall layer, which entraps and/or catches shattering material, may be polycarbonate, polymethyl-methacrylate, or preferably a laminate of polycarbonate and polymethyl-methacrylate bound together via a polymer interlayer. The spall layer is preferably from about 10-20 mm thick. Polymethyl methacrylate (PMMA), or poly (methyl 2-methylpropenoate) is the polymer of methyl methacrylate. The thermoplastic and transparent plastic is sold by the trade names PLEXIGLASS®, PLEXIGLAS-G®, R-CAST®, PERSPEX®, PLAZCRYL®, LIMACRYL®, ACRYLEX®, ACRYLITE®, ACRYLPLAST®, ALTUGLAS®, POLYCAST® and LUCITE®. It is often also commonly called acrylic glass or simply acrylic.

Polycarbonate is lightweight and highly fracture resistant particularly when compared to silica glass. This polymer also is highly transparent to visible light and is sold by the trade names LEXAN® from General Electric, CALIBRE® from Dow Chemicals, MAKROLON® from Bayer and PAN- LITE® from Teijin Chemical Limited. Most preferably, the spall layer is a laminate of polycarbonate and polymethylmethacrylate bound together via a polymer interlayer. The polycarbonate layer provides a stretchable support to the PMMA layer, which undergoes stiffening/hardening at high strain rates.

In certain circumstances it is desirable to bond an additional glass layer to the outer surface of the spall layer. This allows the transparent laminate to be cleaned using solvents or abrasive cleaners without substantial degradation of the optical properties of the laminate.

The laminate may also incorporate other conventional functional thin layers to provide coloring, optical, anti-glare, anti-dirt, anti-scratch, and anti-frost functions. Additionally, a network of antenna conductors or heating wires and/or any peripheral cladding of enamel or opaque paint may also be added to the laminate. Glass and glass-ceramic layers are typically not hard enough to cause the erosion of armor-piercing projectiles or projectile cores. In order to defeat an armor-piercing round like, for example, 0.30 cal. AP-M2 at 2750 fps, one has to engage different failure/defeat mechanisms by selecting the thickness and the sequence of the materials employed accordingly. In multi-layer glass/glass-ceramic/polymer systems one typically observes different failure modes for each layer: brittle fraction, plugging/cone fracture, radial fracture and fragmentation for glass and glass-ceramic layers; ductile hole growth for polymers like polycarbonates; and radial fracture and brittle fracture for polymers like polymethyl-meth-acrylate.

In certain embodiments, the thickness of the individual layers maybe important to consider. As a rule-of-thumb, the thinner the layer(s), the smaller is the diameter of the destruction zone perpendicular to the projectile path. However, in general, the ballistic performance will suffer, if the layers are too thin or too thick for the given material. If the layers are too thin, individual layers can break from the back face of each layer in rapid succession upon or shortly after impact, thereby decreasing resistance against the projectile which passes through already destroyed layers. If, on the other hand, the layers are too thick for the given material the failure wave traveling in front of the projectile comminutes material in advance over a greater distance, thereby decreasing resistance against the projectile.

In certain embodiments the sequence of the various layers can be an important factor to consider. In the wrong sequence, the kinetic energy loss induced by preceding layers is not high enough so that subsequent layers are able to hold-up to the progressing projectile. Sequence is also important for projectile destabilization (tipping, turning) and to induce projectile fragmentation by side-impact and deformation (blunting, etc.).

The experimental results obtained with small samples on a PC backing as support show that samples with BOROFLOAT® perform best when BOROFLOAT® is positioned in the middle of the laminate lay up. It was found, that systems incorporating a sequence of ROBAX® layers in the glassy or the glass-ceramic state have the ability to erode the tip of 0.30 cal AP-M2 steel cores (see FIG. 10). Furthermore, if the thickness and the sequence of the individual layers are selected right, the projectile will deviate from the original trajectory, and is fragmented inside the laminate.

In a preferred embodiment the multi-layer laminate according to the invention has the following layers:

| # Of layers/layer designation | Layer composition | Layer thickness |
| --- | --- | --- |
| One layer/layer a | Strike face layer | 3 mm |
| Three layers/layer b | Transparent Glass ceramic Layers | 8 mm each |
| One layer/layer c | Borosilicate Glass layer | 21 mm |
| One layer/Spall layer d | Polymethylmethacrylate(PMMA) laminated to Polycarbonate (PC) | 18 mm |

In another preferred embodiment the multi-layer laminate according to the invention has the following layer sequence:

| Layer | Material | Thickness |
| --- | --- | --- |
| a) | Strike face BOROFLOAT® | 3 mm-6 mm |
| b) | ROBAX® | 8 mm-12 mm |
| b) | ROBAX® | 8 mm-12 mm |
| c) | BOROFLOAT® | 18 mm-25 mm |
| b) | ROBAX® | 8 mm-12 mm |
| d) | Spall Layer - Polymethylmetaacrylate laminated to Polycarbonate | 12 mm-18 mm |

In another preferred embodiment the multi-layer laminate according to the invention has the following layer sequence:

| Layer | Material | Thickness |
| --- | --- | --- |
| a) | Strike face BOROFLOAT® | 3 mm-6 mm |
| b) | ROBAX® | 8 mm-12 mm |
| b) | ROBAX® | 8 mm-12 mm |
| c) | BOROFLOAT® | 9 mm-11 mm |
| c) | BOROFLOAT® | 9 mm-11 mm |
| b) | ROBAX® | 8 mm-12 mm |
| d) | Spall Layer - Polymethylmethacrylate laminated to Polycarbonate | 12 mm-18 mm |

In another preferred embodiment the multi-layer laminate according to the invention has the following layer sequence:

| Layer | Material | Thickness |
| --- | --- | --- |
| a) | Strike face BOROFLOAT® | 3 mm-6 mm |
| b) | ZERODUR® | 8 mm-12 mm |
| b) | ZERODUR® | 8 mm-12 mm |
| c) | BOROFLOAT® | 9 mm-11 mm |
| c) | BOROFLOAT® | 9 mm-11 mm |
| b) | ZERODUR® | 8 mm-12 mm |
| d) | Spall Layer-Polymethylmethacrylate laminated to Polycarbonate | 12 mm-18 mm |

In another preferred embodiment the multi-layer laminate according to the invention has the following layer sequence:

| Layer | Material | Thickness range |
| --- | --- | --- |
| a) | Strike face-BOROFLOAT® | 3 mm-6 mm |
| b) | ALSTOM TRANSARM® | 8 mm-12 mm |
| b) | ALSTOM TRANSARM® | 8 mm-12 mm |
| c) | BOROFLOAT® | 9 mm-11 mm |
| c) | BOROFLOAT® | 9 mm-11 mm |
| b) | ALSTOM TRANSARM® | 8 mm-12 mm |
| d) | Spall Layer-Polymethylmethacrylate laminated to Polycarbonate | 12 mm-18 mm |

In another preferred embodiment the multi-layer laminate according to the invention has the following layer sequence:

| Layer | Material | Thickness range |
|---|---|---|
| a) | Strike face PYREX ® | 3 mm-6 mm |
| b) | ROBAX ® | 8 mm-12 mm |
| b) | ROBAX ® | 8 mm-12 mm |
| c) | BOROFLOAT ® | 18 mm-25 mm |
| b) | ROBAX ® | 8 mm-12 mm |
| d) | Spall Layer-Polymethylmethacrylate laminated to Polycarbonate | 12 mm-18 mm |

In another preferred embodiment the multi-layer laminate according to the invention has the following layers:

| # of layers/layer designation | Layer composition | Layer thickness |
|---|---|---|
| One layer/layer a | Glass ceramic Strike face layer | 3 mm |
| At least 2-layers/layer b | Transparent Glass ceramic Layers | 8 mm each |
| One layer/layer c | Borosilicate Glass layer | 21 mm |
| One layer/Spall layer d | Polymethylmethacrylate(PMMA) laminated to Polycarbonate (PC) | 18 mm |

In another preferred embodiment the multi-layer laminate according to the invention has the following layer sequence:

| Layer | Material | Thickness |
|---|---|---|
| a) | Strike face ROBAX ® | 8 mm-12 mm |
| b) | ROBAX ® | 8 mm-12 mm |
| c) | BOROFLOAT ® | 18 mm-25 mm |
| b) | ROBAX ® | 8 mm-12 mm |
| d) | Spall Layer-Polymethylmethacrylate laminated to Polycarbonate | 12 mm-18 mm. |

In another preferred embodiment the multi-layer laminate according to the invention has the following layer sequence:

| Material | Thickness |
|---|---|
| ROBAX ® | 8 mm-12 mm |
| BOROFLOAT ® | 18 mm-25 mm |
| ROBAX ® | 8 mm-12 mm |
| Spall Layer-Polymethylmethacrylate laminated to Polycarbonate | 12 mm-18 mm. |

In another preferred embodiment the multi-layer laminate according to the invention has the following layer sequence:

| Material | Thickness |
|---|---|
| ROBAX ® | 8 mm-12 mm |
| Borosilicate | 18 mm-25 mm |
| ROBAX ® | 8 mm-12 mm |
| Spall Layer-Polymethylmethacrylate laminated to Polycarbonate | 12 mm-18 mm. |

In another preferred embodiment the multi-layer laminate according to the invention has the following layer sequence:

| Material | Thickness |
|---|---|
| TRANSARM ® | 8 mm-12 mm |
| BOROFLOAT ® | 9 mm-11 mm |
| BOROFLOAT ® | 9 mm-11 mm |
| TRANSARM ® | 8 mm-12 mm |
| Spall Layer-Polymethylmethacrylate laminated to Polycarbonate | 12 mm-18 mm. |

The multi-layer transparent laminate of the present invention can be made by conventional methods such as, for example, by assembling the interlayers and layers in the desired sequence, and feeding them through an autoclave to apply heat and pressure. Alternatively, the multi-layer transparent laminate of the present invention can be made by the methods taught in WO93/22136, which is hereby incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

A combination of DOP (Depth-of-Penetration) and Vs/Vr (strike velocity versus residual velocity) is conducted to determine the kinetic energy loss, the critical areal density and the limit thickness for monolithic layers under different failure modes and defeat mechanisms. The results of these tests are then used as a guideline to determine thickness ranges for individual layers, as well as the number of layers needed to successfully defeat a 0.30 cal. AP-M2 projectile at impact speeds of up to 2750 fps.

The projectile is launched against the target with a powder-actuated, universal gun. The projectile speed is measured using two sets of lightscreens; reported are the individual speeds as well as the average.

To engage different failure and defeat modes, the small-size samples are mounted against different types of backings.

In the first type of tests, the sample is mounted with epoxy on a rigid, semi-infinite backing. To determine the influence of the impedance mismatch between sample and backing, tests are conducted against RHA Steel as well as an aluminum alloy. In both cases, the monolithic sample itself is confined with a tight-fitting frame. The sample is uniformly supported, and fails mainly in compression. The depth-of-penetration of the projectile into the rigid backing is measured. In the second type of test, the sample is mounted either (a) with a polymer film on an oversized polycarbonate backing, or (b) with epoxy on an oversized backing made from a high-strength aluminum alloy. In both cases, the monolithic sample is unconfined. The backing flexes upon impact, and the samples fails in a combination of compression and tension. Measured is the residual velocity of the projectile by using a high-speed camera. FIG. 9 shows the typical appearance of a monolithic sample mounted on an oversized polycarbonate backing before and after ballistic testing; the sample successfully defeated a 0.30 cal. AP-M2 round.

By using a combination of these tests it is possible to estimate the kinetic energy loss of the projectile for different impact scenarios, and derive for a given threat thickness ranges for individual layers as well as layer combinations which serve as a starting point for the design and optimization of a multi-layer system.

Example 1

The following arrangement of laminate layers provides protection against 0.30 cal. AP-M2 projectiles at speeds of up to 2750 fps. The window, without frame, exhibits an areal density of 30 psf or less.

Strike face: SCHOTT BOROFLOAT with a thickness between 4 mm to 6 mm
   1st Interlayer: 25 mil PU (Polyurethane) film (Huntsman PE501 or similar)
1st Layer (b): SCHOTT ROBAX Glass Ceramic with a thickness between 7 mm to 8 mm
   2nd Interlayer: 25 mil PU film (Huntsman PE501 or similar), or 25 mil PVB (Polyvinylbutyral) film
2nd Layer (b): SCHOTT ROBAX Glass Ceramic with a thickness between 7 mm to 8 mm
   3rd Interlayer: 25 mil PU film (Huntsman PE501 or similar), or 25 mil PVB film (Polyvinylbutyral)
3rd Layer (c):
Option A: single-layer SCHOTT BOROFLOAT with a thickness between 18 mm to 21 mm
or
Option B: double-layer SCHOTT BOROFLOAT with a thickness of each individual layer between 9 mm to 11 mm, bonded with 25 mil PVB or PU film
   4th Interlayer: 25 mil PU film (Huntsman PE501 or similar), or 25 mil PVB film (Polyvinylbutyral)
4th Layer(b): ROBAX Glass Ceramic with a thickness between 7 mm to 8 mm
   5th Interlayer: 75 mil PU film (Huntsman PE501 or similar)
1st Spall layer: 6 mm or 9 mm PMMA (Polymethyl-methacrylate)
Bonding layer 25 mil PU film, or similar
2nd Spall layer: 6 mm, 9 mm or 12 mm PC (Polycarbonate)
Optional: 2 mm thin glass sheet bonded with 75 mil PU film to the 2nd spall layer for scratch protection

Example 2

Ballistic Test Results

Small, multi-layer test coupons (100 mm×100 mm) are mounted on a 12"×12"×12 mm thick polycarbonate backing. The samples are tested in a configuration similar to the one shown in FIG. 9. The test projectile is 0.30 cal. AP-M2 at the indicated nominal speed (2250 fps or 2750 fps). Based on the test results, the design described in Example 1 is derived combining the two multi-layer sequences marked with an asterisk in Table 2 to accommodate for scaling.

TABLE 1A

Ballistic Test Results - 2250 fps impacts by 0.30 cal. AP-M2

| Shot Number | Weights (Grains) Projectile | Weights (Grains) Propellant | Velocity Data (ft/sec) No. 1 | Velocity Data (ft/sec) No. 2 | Velocity Data (ft/sec) Average | Penetration Description/ Pen. into PB |
|---|---|---|---|---|---|---|
| 9-17564 | 162.8 | 34.4 | 2283 | 2281 | 2282 | No Penetration |
| 9-17565 | 163.4 | 34.4 | 2259 | 2259 | 2259 | No Penetration |
| 9-17566 | 163.1 | 34.4 | 2254 | 2254 | 2254 | No Penetration |
| 9-17567 | 163.5 | 34.4 | 2222 | 2222 | 2222 | No Penetration |
| 9-17568 | 163.3 | 34.4 | 2284 | 2284 | 2284 | No Penetration |
| 9-17569 | 163.4 | 34.4 | 2257 | 2257 | 2257 | No Penetration |
| 9-17570 | 163.6 | 34.4 | 2281 | 2280 | 2281 | No Penetration |
| 9-17571 | 163.4 | 34.4 | 2268 | 2267 | 2268 | No Penetration |

TABLE 1B

Ballistic Test Results - 2750 fps impacts by 0.30 CAL AP-M2

| Shot Number | Weights (Grains) Projectile | Weights (Grains) Propellant | Velocity Data (ft/sec) No. 1 | Velocity Data (ft/sec) No. 2 | Velocity Data (ft/sec) Average | Penetration Description/ Pen. into PB |
|---|---|---|---|---|---|---|
| 9-17572 | 162.8 | 44.5 | 2759 | 2759 | 2759 | Penetration, 300 pages (1) |
| 9-17573 | 162.8 | 44.5 | 2761 | 2761 | 2761 | Penetration, 600 pages (1) |
| 9-17574 | 162.8 | 44 5 | 2717 | 2716 | 2761 | Penetration, 600 pages (1) |
| 9-17575 | 162.4 | 44.6 | 2751 | 2751 | 2751 | Penetration, 450 pages |
| 9-17576 | 163.6 | 44.7 | 2770 | 2769 | 2770 | Penetration, 1100 pages |
| 9-17577 | 164.0 | 44.7 | 2768 | 2768 | 2768 | Penetration, 1800 pages |
| 9-17578 | 162.5 | 44.7 | 2746 | 2745 | 2746 | No Penetration |
| 9-17579 | 163.2 | 44.7 | 2759 | 2759 | 2759 | Pentetration (2) |

(PB) Denotes phone book and value indicates the No. of pages penetrated. 1 PB = ~1200 pages.
Single center tile impacts at two velocities: 2250 ± 30 fps and 2750 ± 30 fps.
(1) Denotes the recovered projectile was fractured, not intact.
(2) Denotes the projectile was thrown to the far left exiting the target and missed the phone books.

TABLE 2

Layer Sequence vs. Result of Ballistic Impact Test

| Design | Layer Sequence (Strikeface first) | Areal Density | Shot Number | Impact Velocity | Result |
|---|---|---|---|---|---|
| 01 | ROBAX-8 mm/ROBAX-8 mm/ROBAX-8 mm/ ROBAX-8 mm/PC-12 mm | 19 | 9-17564 | 2282 | PP |
|  |  |  | 9-17572 | 2759 | CP |
| 02 | ROBAXG-8 mm/ROB AXG-8 mm/ROBAXG-8 mm/ ROBAXG-8 mm/PC-12 mm | 19 | 9-17565 | 2259 | PP |
|  |  |  | 9-17573 | 2761 | CP |
| 03* | ROBAX-8 mm/BOROFLOAT-21 mm/ROBAX-8 mm/ PC-12 mm | 21 | 9-17566 | 2254 | PP |
|  |  |  | 9-17574 | 2717 | PP |
| 04 | BOROFLOAT-21 mm/ROBAX-8 mm/ROBAX-8 mm/ PC-12 mm | 21 | 9-17567 | 2222 | PP |
|  |  |  | 9-17575 | 2751 | CP |

TABLE 2-continued

Layer Sequence vs. Result of Ballistic Impact Test

| Design | Layer Sequence (Strikeface first) | Areal Density | Shot Number | Impact Velocity | Result |
|---|---|---|---|---|---|
| 05 | BOROFLOAT-21 mm/ROBAX-8 mm/ROBAX-8 mm/ROBAX-8 mm/PC-12 mm | 25 | 9-17568 | 2284 | PP |
|  |  |  | 9-17576 | 2770 | CP |
| 06 | BOROFLOAT-21 mm/ROBAXG-8 mm/ROBAXG-8 mm/ROBAXG-8 mm/PC-12 mm | 25 | 9-17569 | 2257 | PP |
|  |  |  | 9-17577 | 2768 | CP |
| 07 | ROBAXG-8 mm/ROBAXG-8 mm/ROBAXG-8 mm/BOROFLOAT-21 mm/PC-12 mm | 25 | 9-17570 | 2281 | PP |
|  |  |  | 9-17578 | 2746 | PP |
| 08* | ROBAX-8 mm/ROBAX-8 mm/BOROFLOAT-21 mm/PC-12 mm | 21 | 9-17571 | 2268 | PP |
|  |  |  | 9-17579 | 2759 | CP |

ROBAX SCHOTT ROBAX - ceramized
ROBAXG SCHOTT ROBAX - glassy
PC GE LEXAN Polycarbonate backing
BOROFLOAT SCHOTT BOROFLOAT Samples are considered to pass if and only if the spall layer is not pierced by fragments (i.e., penetration). In the tables, CP denotes "Complete Penetration". If at least one fragment pierced the spall layer then the layer failed. PP denotes "Partial Penetration". If the projectile penetrated into the laminate and was stopped, and no fragments pierced the spall layer, the sample passed. The ROBAX 8 mm/BOROFLOAT 21 mm/ROBAX 8 mm samples passed at both impact velocities (9-17566, 9-17574). The ROBAX 8 mm/ROBAX 8 mm/ROBAX 8 mm/BOROFLOAT 21 mm samples (9-17570, 9-17578) induced different defeat modes. One preferred design is a combination of ROBAX 8 mm/ROBAX 8 mm/BOROFLOAT 21 mm (9-17579), which almost passed and induced core fragmentation by tipping the projectile and ROBAX 8 mm/BOROFLOAT 21 mm/ROBAX 8 mm (9-17566, 9-17574). The combination of both designs is desired in order to achieve comparable ballistic performance of the full-scale window, and to achieve multi-hit capability (three shots placed in a 120 mm triangle).

Example 3

Multi-Hit Example

Three 500 mm×500 mm test coupons for multi-hit testing are prepared, and tested against an 0.30 cal. AP-M2 round at nominal 2750 fps; the shot pattern is a 120 mm triangle, the shot sequence is 12 O'clock, 4 O'clock and 8 O'clock. The nominal areal density of the samples is 29 psf; due to slight variations in the thickness of the individual glass and glass-ceramic layers, the areal density of the samples as manufactured is 29.7 psf (samples 1 and 2) and 30 psf (sample 3). The samples have the following structure:

| Sample 1 | |
|---|---|
| 500 mm × 500 mm, edges sealed, frameless | |
| Strikeface | 6 mm Borofloat |
| Interlayer | Huntsman PE-501 — 25 mil |
| Ply 01 | 8 mm Robax Glass-ceramic |
| Interlayer | Huntsman PE-501 — 25 mil |
| Ply 02 | 8 mm Robax Glass-Ceramic |
| Interlayer | Huntsman PE-501 — 25 mil |
| Ply 03 | 21 mm Borofloat |
| Interlayer | Huntsman PE-501 — 25 mil |
| Ply 04 | 8 mm Robax |
| Interlayer | Huntsman PE-501 — 75 mil |
| Spall-Layer | 9 mm PMMA laminated to 9 mm PC (Lexan) |

| Sample 2 | |
|---|---|
| 500 mm × 500 mm, edges sealed, frameless | |
| Strikeface | 6 mm Borofloat |
| Interlayer | Huntsman PE-501 — 25 mil |
| Ply 01 | 8 mm Robax Glassceramic |
| Interlayer | PVB — 25 mil |
| Ply 02 | 8 mm Robax Glass-Ceramic |
| Interlayer | Huntsman PE-501 — 25 mil |
| Ply 03 | 21 mm Borofloat |
| Interlayer | Huntsman PE-501 — 25 mil |
| Ply 04 | 8 mm Robax |
| Interlayer | Huntsman PE-501 — 75 mil |
| Spall-Layer | 9 mm PMMA laminated to 9 mm PC (Lexan) |

| Sample 3 | |
|---|---|
| 500 mm × 500 mm, edges sealed, frameless | |
| Strikeface | 6 mm Borofloat |
| Interlayer | Huntsman PE-501 — 25 mil |
| Ply 01 | 8 mm Robax Glassceramic |
| Interlayer | PVB — 25 mil |
| Ply 02 | 8 mm Robax Glass-Ceramic |
| Interlayer | Huntsman PE-501 — 25 mil |
| Ply 03a | 11 mm Borofloat |
| Interlayer | Huntsman PE-501 — 25 mil |
| Ply 03b | 11 mm Borofloat |
| Interlayer | Huntsman PE-501 — 25 mil |
| Ply 04 | 8 mm Robax |
| Interlayer | Huntsman PE-501 — 75 mil |
| Spall-Layer | 9 mm PMMA laminated to 9 mm PC (Lexan) |

Test Results (Multi-Hit Test)

| Sample | Shot Number | Weights (Grains) | | Velocity Data (ft/sec) | | | Penetration |
| | | Projectile | Propellant | No. 1 | No. 2 | Average | Description/Sample |
|---|---|---|---|---|---|---|---|
| 1 | 9-18294 | 163.3 | 47 | 2749 | 2747 | 2748 | No Penetration, 12 O'clock |
|  | 9-18295 | 163.2 | 47 | 2769 | 267 | 2768 | Penetration, 4 O'clock |
|  | 9-18296 | 162.5 | 47.5 | 2778 | 2777 | 2778 | Penetration, 8 O'clock |
| 2 | 9-18297 | 162.8 | 47 | 2730 | 2729 | 2730 | No Penetration, 12 O'clock |
|  | 9-18298 | 163.4 | 47.2 | 2774 | 2772 | 2773 | No Penetration, 4 O'clock |
|  | 9-18299 | 163.7 | 47.2 | 2756 | 2755 | 2756 | No Penetration, 8 O'clock |
| 3 | 9-18300 | 163.4 | 47.2 | 2740 | 2737 | 2739 | No Penetration, |

-continued

Test Results (Multi-Hit Test)

| Sample | Shot Number | Weights (Grains) | | Velocity Data (ft/sec) | | | Penetration Description/ Sample |
|---|---|---|---|---|---|---|---|
| | | Projectile | Propellant | No. 1 | No. 2 | Average | |
| | 9-18301 | 162.7 | 47.2 | 2778 | 2777 | 2778 | 12 O'clock No Penetration, 4 O'clock |
| | 9-18302 | 163.5 | 47.2 | 2798 | 2798 | 2798 | No Penetration, 8 O'clock |

Figure 11:
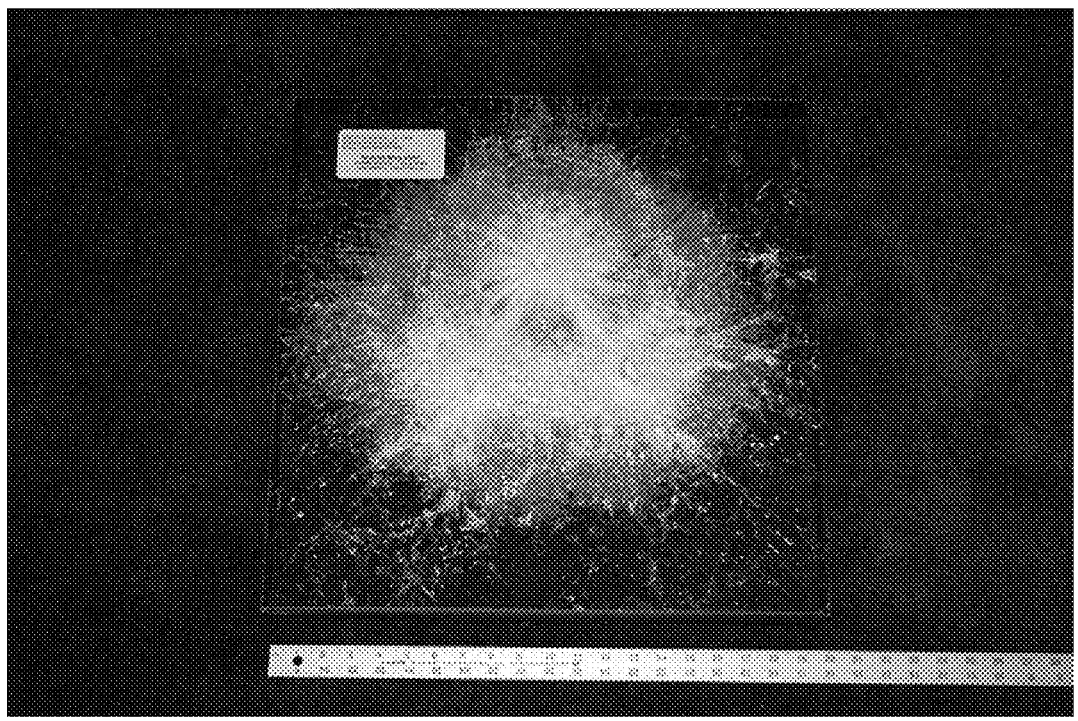
FIG. 11 shows the strikeface of sample No 3 in Example 3 after the test. No bulging or other deformation of the spall layer is observed.
Figure 12:
FIG. 12 shows the back spall layer of sample No 3 in Example 3. No bulging or other deformation of the spall layer was observed.

Whereas sample No 1 failed on the $2^{nd}$ and the $3^{rd}$ shot, samples No. 2 and No. 3 according to the present invention withstood all three shots. FIG. 11 shows the strike face of sample No. 3 after the test, FIG. 12 shows the back (spall layer) of sample No 3. For samples No. 2 and No. 3, no bulging or other deformation of the spall layer is observed.

The entire disclosures of all applications, patents and publications, cited herein are incorporated by reference herein.

Additionally, the following five references provide background and general knowledge to one skilled in the art and are incorporated herein by reference.
1. NATO AEP-55 Volume 1 (Edition 1) February 2005 (PROCEDURES FOR EVALUATING THE PROTECTION LEVELS OF LOGISTIC AND LIGHT ARMOURED VEHICLES FOR KE AND ARTILLERY THREATS).
2. US Military Specification MIL-G-5485D (22 Feb. 1993).
3. Horsfall et al. A Comparison of the Performance of Various Light Armour Piercing Ammunition, Journal of Battlefield Technology, Vol 3, No 3, November 2000.
4. Moy, P. et al. Dynamic stress-strain response and failure behaviour of PMMA. Proceedings of the ASME International Mechanical Engineering Conference, Washington, D.C., November 2003.
5. Kinloch A. I. Fracture Behavior of Polymers, Applied Science Publishers, New York, NY.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A transparent multi-layer laminate comprising:
a strike face layer of soda-lime or borosilicate glass;
a first glass-ceramic layer;
an intermediate layer of soda-lime or borosilicate glass;
a second glass-ceramic layer; and
a polymer spall layer as a rear layer of the laminate,
wherein each of said strike face layer, said first glass-ceramic layer, said intermediate layer, said second glass-ceramic layer, and said polymer spall layer are bound to an adjacent layer by one of a plurality of polymer interlayers, and
wherein the overall thickness of the laminate is less than 80 mm.

2. The laminate of claim 1, wherein said first glass ceramic layer and said second glass-ceramic layer are each independently a lithium-alumo-silicate glass ceramic or a lithium-disilicate glass ceramic.

3. The laminate of claim 1, wherein said polymer spall layer is polycarbonate, polymethyl-methacrylate, or a laminate of polycarbonate and polymethyl-methacrylate.

4. The laminate of claim 1, wherein each of said polymer interlayers is a polyurethane or polyvinylbutyral film.

5. The laminate of claim 1, wherein the intermediate layer is 14 to 25 mm thick.

6. The laminate of claim 1, wherein each of said first glass-ceramic layer and said second glass-ceramic layer is 6-14 mm thick.

7. A glass based transparent armor comprising the laminate of claim 1.

8. The laminate of claim 5, wherein the intermediate layer is two individual layers bound together by a polymer interlayer.

9. A transparent multi-layer laminate comprising:
a) a borosilicate outer strike face layer;
b) at least three glass-ceramic layers;
c) an intermediate layer of soda-lime or borosilicate glass layer; and
d) a polymer spall layer;
wherein layers b) and c) are disposed between said strike face layer a) and said polymer spall layer d),
wherein each of said layers a), b), c), and d) are bound to adjacent layers by one of a plurality of polymer interlayers, and
wherein the overall thickness of the laminate is less than 80 mm.

10. The laminate of claim 9, wherein said outer strike face layer is 3-6 mm thick.

11. The laminate of claim 9, wherein each of said at least three glass ceramic layers b) are independently a lithium-alumo-silicate glass ceramic or a lithium-disilicate glass ceramic.

12. The laminate of claim 9, wherein said polymer spall layer d) his polycarbonate, polymethyl-methacrylate, or a laminate of polycarbonate and polymethyl-methacrylate.

13. The laminate of claim 9, wherein said each of said plurality of polymer interlayers is a polyurethane or polyvinylbutyral film.

14. The laminate of claim 9, wherein the strike face layer a) is 3-6 mm thick, each layer b) is 6-14 mm thick, layer c) is 14 to 25 mm thick, said polymer spall layer d) is 10-20 mm thick, and each of said plurality of polymer interlayers is 10-80 mil thick.

15. The laminate of claim 9, wherein the overall thickness of the laminate is less than 70 mm.

16. A transparent armor comprising a laminate of claim 9.

17. The armor of claim 16, which can defeat an 0.30 cal. AP-M2 projectile at an impact speed of up to 2750 fps.

18. A method of securing a space from a projectile, comprising placing an armor according to claim 17 between said space and said projectile.

19. A transparent multi-layer laminate comprising:
a strike face layer of soda-lime or borosilicate glass;
at least three glass-ceramic layers;
an intermediate layer of soda-lime or borosilicate glass between two of said glass ceramic layers; and
a polymer spall layer as a rear layer of the laminate,
wherein each of said strike face layer, said at least three glass-ceramic layers, said intermediate layer, and said polymer layers are bound to an adjacent layer by one of a plurality of polymer interlayers, and wherein the overall thickness of the laminate is less than 80 mm.

20. A glass based transparent armor comprising the laminate of claim 19.

21. The laminate of claim 19, wherein said intermediate glass layer is 14 to 25 mm thick.

22. The laminate of claim 19, wherein each glass-ceramic layer is 6-14 mm thick.

23. The laminate of claim 19, wherein the overall thickness of the laminate is less than 70 mm.

24. A method of securing a space from a projectile comprising placing an armor according to claim 20 between said space and said projectile.

25. The laminate of claim 19, wherein each of said at least three glass ceramic layers are independently a lithium-alumosilicate glass ceramic or a lithium-disilicate glass ceramic.

* * * * *